United States Patent
Dadig et al.

(10) Patent No.: US 12,440,913 B2
(45) Date of Patent: Oct. 14, 2025

(54) QUICK-CHANGE LINER FOR USE IN A REMOVABLE GOOSENECK ASSEMBLED IN A WELDING TORCH

(71) Applicant: American Torch Tip Company, Bradenton, FL (US)

(72) Inventors: Steven Dadig, Palmetto, FL (US); Juan Reynaldo Solis, Jr., Bradenton, FL (US)

(73) Assignee: American Torch Tip Company, Bradenton, FL (US)

( * ) Notice: Subject to any disclaimer, the term of this patent is extended or adjusted under 35 U.S.C. 154(b) by 594 days.

(21) Appl. No.: 17/242,279

(22) Filed: Apr. 27, 2021

(65) Prior Publication Data

US 2021/0331267 A1    Oct. 28, 2021

Related U.S. Application Data

(60) Provisional application No. 63/016,984, filed on Apr. 28, 2020.

(51) Int. Cl.
*B23K 9/12* (2006.01)

(52) U.S. Cl.
CPC .................... *B23K 9/122* (2013.01)

(58) Field of Classification Search
CPC ......... B23K 9/122; B23K 9/295; B23K 9/173
USPC ....................................... 219/138
See application file for complete search history.

(56) References Cited

U.S. PATENT DOCUMENTS

| | | | |
|---|---|---|---|
| 2005/0072764 A1* | 4/2005 | Lajoie | B23K 9/122 219/76.14 |
| 2008/0188093 A1* | 8/2008 | Jaeger | H01R 35/04 439/13 |
| 2010/0038345 A1* | 2/2010 | Nishimura | B23K 9/123 219/136 |
| 2013/0240496 A1* | 9/2013 | Kinder | B23K 9/24 219/138 |
| 2014/0110386 A1* | 4/2014 | Centner | B23K 9/173 219/138 |

OTHER PUBLICATIONS

Enable definition, 2005, https://www.merriam-webster.com/dictionary/enable (Year: 2005).*
Gelisen 420Pcs Nitrile Rubber O-Rings Kit, 2017, https://www.amazon.com/dp/B077TPHPNC/ref=syn_sd_onsite_desktop_0?ie=UTF8&pd_rd_plhdr=t&aref=A3CBED08F92BBA4E81CCE7F2438771786BF62EDC00331FFB53 (Year: 2017).*

* cited by examiner

*Primary Examiner* — Tiffany T Tran
(74) *Attorney, Agent, or Firm* — Emerson, Thomson & Bennett, LLC; Roger D. Emerson; Seth J. Niemi

(57) ABSTRACT

A replaceable or quick-change liner for use in a welding torch assembly that includes a liner guide, a section of liner, and a sealing feature for creating a pneumatic seal between the replaceable liner and the welding torch assembly.

12 Claims, 9 Drawing Sheets

QUICK-CHANGE LINER FOR USE IN A REMOVABLE GOOSENECK ASSEMBLED IN A WELDING TORCH

RELATED APPLICATIONS

This application claims the benefit of the filing date of U.S. Provisional Patent Application Ser. No. 63/016,984 filed on Apr. 28, 2020, entitled "Quick-change liner for use in a removable gooseneck assembled in a welding torch" by Dadig, et al., the entirety of which is incorporated herein by reference.

BACKGROUND OF THE INVENTION

Field of Invention

The present invention is in the technical field of welding torches for use in gas metal arc welding (GMAW), or as commonly known, "MIG" welding applications. More particularly, the present invention is in the technical field of replaceable liners for use in welding machines and torches that feed a continuous electrode and use a primary and secondary, or "stub" or "jump" liner, in the gooseneck portion of the welding torch.

Background of the Invention

MIG welding torches have been used in the metal fabrication industry for many years and various manufactures have produced several variations of welding torch bodies or handles. A basic MIG welding torch is presented in FIG. 1 of U.S. Pat. No. 3,529,128 by Cruz (hereinafter '128 patent). As presented in FIG. 1 of the '128 patent, a MIG welding torch 10 has a tubular body 12, a switch actuator 17, a curved insulated neck 18, and a welding head 16. The welding torch presented in the '128 patent is a relatively early design that does not have ergonomic features, removability or rotatability of the insulated neck 18. The ability to remove and or rotate the insulated neck 18 present in the '128 patent, which has come to be commonly known as a "gooseneck," has since been attempted by various manufactures. The majority of removable and rotatable goosenecks use a variation of a locking collar (typically in the form of an annular cavity) that accepts a circular or tubular end of the gooseneck.

Some MIG welding torches that have employed removable goosenecks have also employed a compound liner that includes a main liner and a secondary liner, or "jump" liner. The main liner extends from the electrode feeder, or "wire" feeder, to a measured location extending outside the distal end of the mechanical attachment between the gooseneck and welding torch body. The jump liner extends from the proximal end of the gooseneck to a measured point beyond the distal end of the gooseneck. The jump liner is inserted into the proximal end of the gooseneck and is either mechanically attached or prevented from inserting past the proximal end of the gooseneck by a mechanical stop attached to the proximal end of the jump liner. The gooseneck and welding torch are mated such that the portion of the main liner that extends beyond the distal end of the welding torch is inserted into a hollow portion of the mechanical stop of the jump liner. This mating of liners produces the equivalent of a continuous liner that can be separated at the mechanical attachment point of the gooseneck to the welding torch body. This ability to separate allows for the gooseneck to be replaced with a different length or shape gooseneck or rotated about the central axis of the welding torch body without having to resize the main liner.

As stated earlier, the main liner extends beyond the distal end of the welding torch to a measured length beyond the distal end of the welding torch body. The measured length can vary, but if it is not precisely met, the gooseneck will not properly mate with the welding torch body or electrode and wire feeding issues will occur during operation.

SUMMARY OF THE INVENTION

The present invention provides a removable stub or jump liner for use with a removable gooseneck, which in combination with a mating welding torch body, is used as a MIG welding torch. One embodiment of the present invention is used in a MIG welding torch assembly that has a gooseneck which has a distal and proximal end. The consumables of the MIG welding torch are installed on the proximal end of the gooseneck and the distal end of the gooseneck attaches to the welding torch body. One embodiment of the present invention is a replaceable or "quick-change" liner for use in a welding torch assembly, where the replaceable liner includes a liner guide, a liner section, and at least one sealing feature. The sealing feature of the replaceable liner can create a pneumatic seal during operation of the welding torch assembly. The replaceable liner can have a transition section. The transition section of the replaceable liner can be conical in shape. The transition section can be positioned to abut an axial location, along a central axis, of a distal face of a release member when installed in the welding torch assembly. The transition section of the replaceable liner can be 3.8 mm (0.15 inches in length as measured along a central axis of the replaceable liner. The transition section of the replaceable liner can have an angle between 30° and 60°. The replaceable liner can include a joint section. The joint section of the replaceable liner can be a mechanical connection. The joint section of the replaceable liner can be at least 7.5 mm (0.295 inches) in length as measured along a central axis of the replaceable liner. The liner guide of the replaceable liner is at least one-third the total length of the replaceable liner as measured along a central axis of the replaceable liner. The liner guide of the replaceable liner is at least 50 mm in length as measured along a central axis of the replaceable liner. The liner guide of the replaceable liner can have a ratio of the length of the liner guide to the outer diameter of the main liner in a range between 20.33 to 1 and 13.65 to 1. The liner guide of the replaceable liner can have a ratio of the length of the liner guide to the inner diameter of the main liner in a range between 61 to 1 and 25.54 to 1. The replaceable liner has a distal and a proximal end that extend along a central axis of the replaceable liner. The liner guide can have an internal cavity that is cylindrical in shape and is at least half the total length of the liner guide. The liner guide can have a feed orifice on the proximal end. The liner guide can be connected to the section of liner by a joint. The joint can be a mechanical connection, adhesive connection and or a welded or brazed connection. Abutting the joint between the liner guide and liner section can be a transition section. The transition section can be designed to guide a welding wire or element into the liner section of the replaceable liner. The proximal end of the liner guide can include a least one sealing feature. The sealing feature may comprise an o-ring.

One method of using an embodiment of the invention in a welding torch assembly that has a main liner uses a replaceable liner that includes a liner guide with a transition section, a section of liner, and at least one sealing feature.

The method includes inserting the replaceable liner into the gooseneck of a welding torch assembly to create a sub-assembly, inserting the sub-assembly into a welding torch body, of the welding torch assembly, inserting a main liner into the feed orifice of the liner guide when the sub-assembly is inserted into the welding torch body, and the absence of contact between the distal end of the main liner and the transition section of the liner guide during operation. The sub-assembly can be inserted a depth of at least 25 mm, as measured from a distal end of the welding torch body, along the central axis of the welding torch assembly. An additional step which may be included is the of trimming the main liner to be flush with the distal face of the release member of the welding torch handle when the release member is in the release position can be included in practicing the method.

Another method of using an embodiment of the invention in a welding torch assembly having a main liner uses a replaceable liner that includes a liner guide with a transition section, a section of liner, and at least one sealing feature which can be practiced by inserting the replaceable liner into the gooseneck of a welding torch assembly to create a sub-assembly, inserting the sub-assembly into a welding torch body, of the welding torch assembly, inserting a main liner into the feed orifice of the liner guide when the sub-assembly is inserted into the welding torch body, and contact between the distal end of the main liner and the transition section of the liner guide during operation. The sub-assembly can be inserted a depth of at least 25 mm, as measured from a distal end of the welding torch body, along the central axis of the welding torch assembly. The additional step of compressing or applying force in the axial direction along the central axis of the welding torch assembly to the sub-assembly when the sub-assembly is installed in the welding torch handle. An additional step which can be included is the trimming the main liner to be flush with the distal face of the release member of the welding torch handle when the release member is in the locked position can be included in practicing the method.

BRIEF DESCRIPTION OF THE DRAWINGS

Figures are not drawn to scale. The figures depict one or more embodiments of the present invention. The features, aspects and advantages of the present disclosure will become better understood when the following detailed description is read with reference to the accompanying drawings in which like characters represent like parts throughout the drawings, wherein.

DETAILED DESCRIPTION OF THE INVENTION

Figure 1:
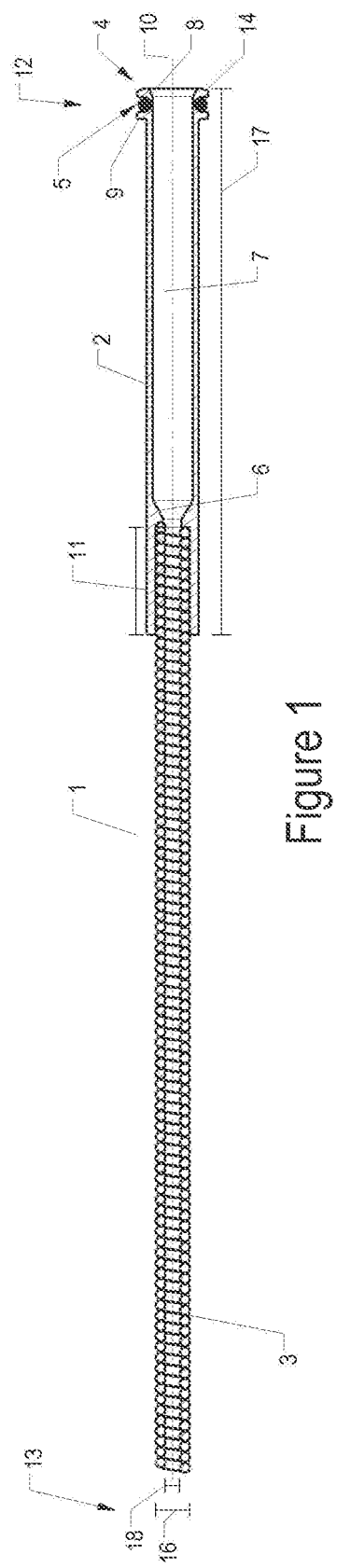
FIG. 1 is a cross-section view of a quick-change liner in accordance with an embodiment of the invention.

Referring now to the drawings, wherein like reference numerals designate identical or corresponding parts throughout the several views, embodiments of the invention are shown. The present invention is a quick-change liner for use in welding and cutting devices, such a devices commonly referred to as "MIG" welding torches or hand held MIG welding torches.

Figure 7:
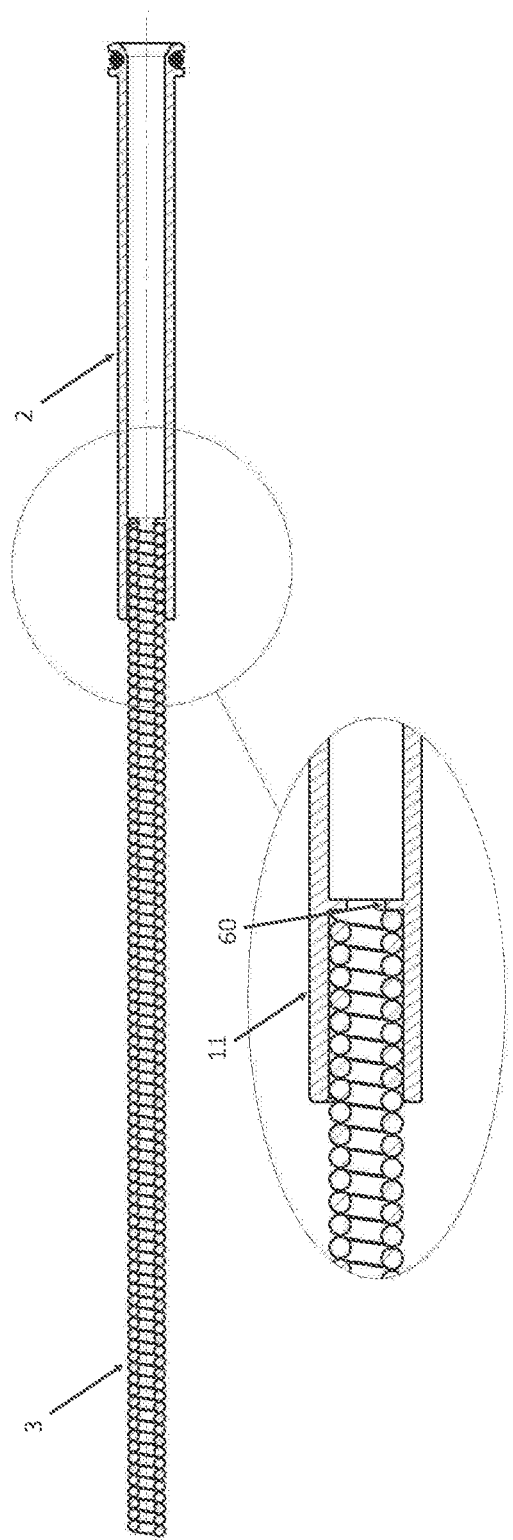
FIG. 7 is a cross-section view of an embodiment of a quick-change liner with a stepped transition.
Figure 8:
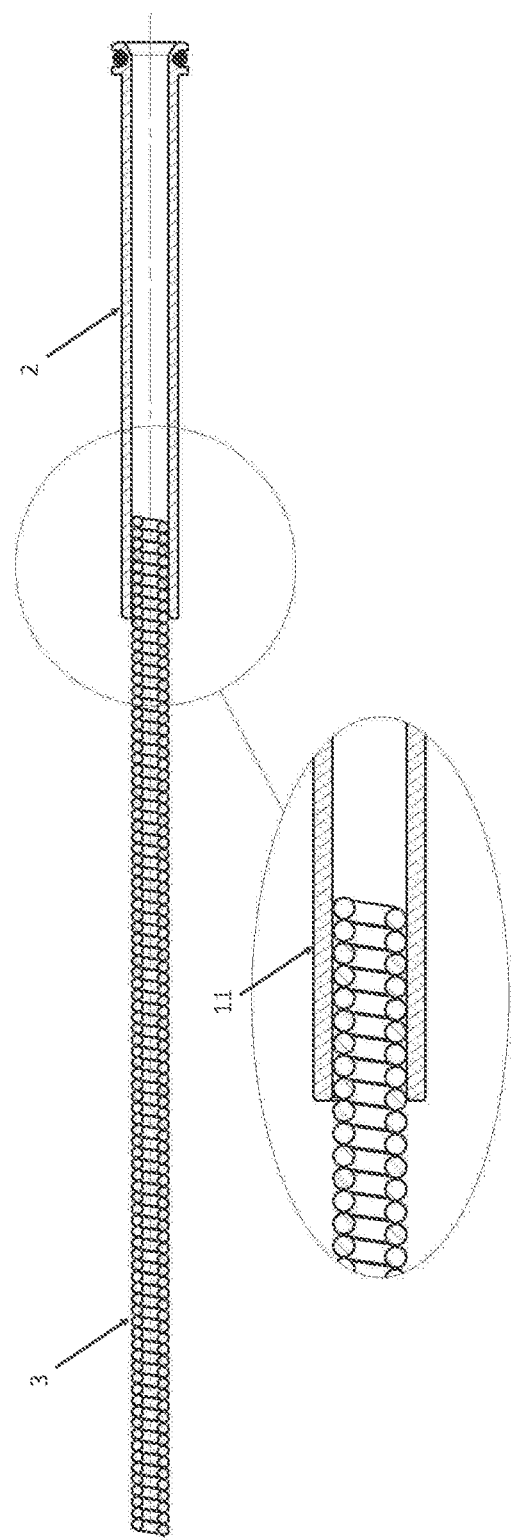
FIG. 8 is a view in cross-section view of an embodiment of a quick-change liner with no predefined transition section.
Figure 9:
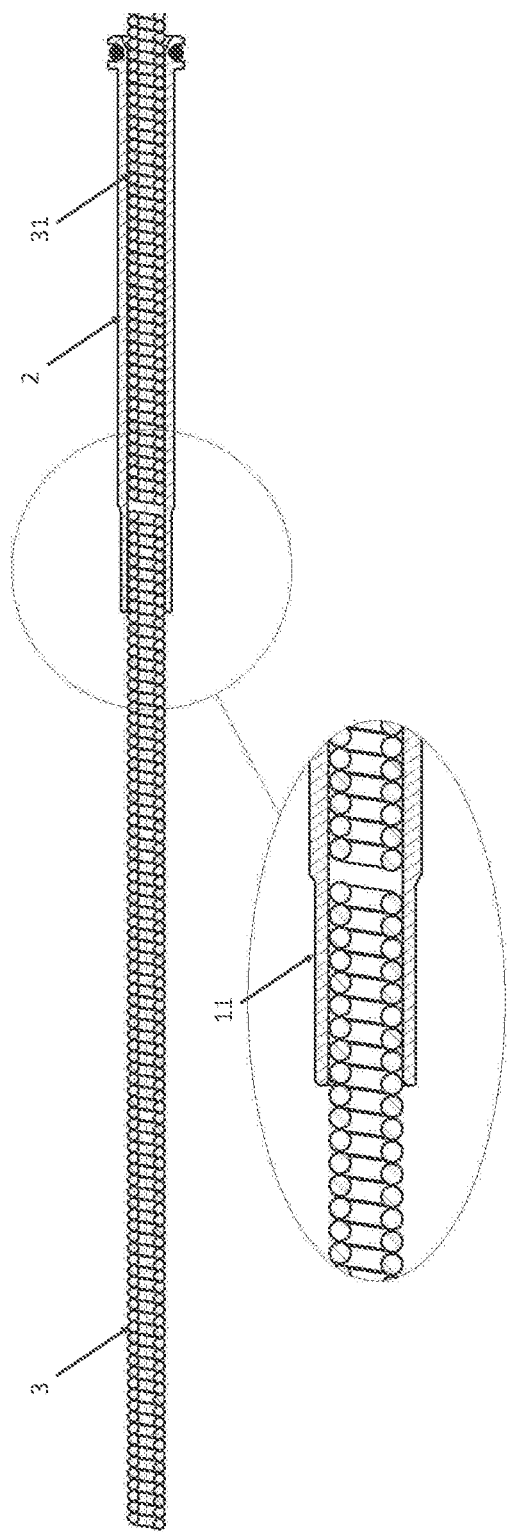
FIG. 9 is a view in cross-section view of an embodiment of a quick-change liner with no predefined transition section and a crimped joint section.

A cross-sectional view of a quick-change liner 1 in accordance with an embodiment of the invention can be seen in FIG. 1. The quick-change liner 1 has a liner guide 2 located on the proximal end 12 of the quick-change liner 1. The liner guide 2 has an internal cavity 7 that can be cylindrical in shape but can transition into other shapes as needed by the particular embodiment. In this embodiment, the cylindrical portion of internal cavity 7 ends in a transition section, but other embodiments can have no transition section predefined in the liner guide 2, See FIGS. 8 and 9. Or by way of example a stepped transition section 60 can be employed in another embodiment of the liner guide 2 as seen in FIG. 7. In embodiment of FIG. 1, the transition section is a conical section 6 that has an angle dimensioned to guide the welding wire into the portion of the liner 3 located within joint 11. The angle of the conical section 6 can be between 30° and 60° but 30° has been found to be advantageous in testing. The liner guide 2 can have a feed orifice 4 located at the proximal end 12 of the quick-change liner 1. The feed orifice 4 can have a centering feature 8 (a chamfer in this embodiment) that guides the main liner 31 during insertion into the liner guide 2. The liner guide 2 has a total length 17 as measured relative to central axis 7 that is at least 50.8 mm (2 in.) in length. In one embodiment a liner guide 2 has a total length 17 of 77.5 mm (3.05 inches), which has been found to be advantageous during testing. In an embodiment with a total length of 77.5 mm (3.05 inches), the total length 17 of the liner guide 2 represents at least ⅓ of the total length of the quick-change liner 1, when installed in a welding torch assembly 37. In another embodiment, a liner guide 2, with a total length 17 of 65.5 mm (2.58 inches) has been found to be advantageous during testing, which also represents at least ⅓ the total length of the quick-change liner 1 when installed in a welding torch assembly 37.

The liner guide 2 is mated with a segment or section of liner 3 at joint 11 of the quick-change liner 1. In this embodiment, joint 11 is represented by a cylindrical cavity that the liner 3 is inserted within. The section of liner 3 can be mechanically attached to liner guide 2 at joint 11. The form of mechanical attachment of the joint 11 can be among any known method of mechanical attachment, including but not limited to adhesive bonding, brazing, welding, crimping, swaging, compression fit or threaded connection. Additional embodiments of the liner guide 2 can have no transition section predefined in the liner guide 2 between the internal cavity 7 and joint 11, such that the liner guide 2 has one continuous internal diameter and liner 3 is mechanically attached at Joint 11. In this example embodiment the liner 3 could act as a mechanical stop for the main liner 31 during operation, effectively acting as a transition section 6 that is a step or orifice shaped. See FIGS. 7-9. Joint 11 can be at least 10 mm in length. In one embodiment joint 11 is 15.24 mm (0.60 inches) in length as measured about the central axis 7. The liner 3 extends from joint 11 to the distal end 13 of the quick-change liner 1. The quick-change liner 1 has a sealing feature 5, in this embodiment an O-ring, located at the outer diameter of the proximal end 12 of the quick-change liner 1. Also, located at the proximal end 12 of the quick-change liner 1 is a locating feature 9 (a flange in this embodiment) that prevents the quick-change liner 1 from being inserted beyond a predefined location within the gooseneck 20. The locating feature 9 can be any known mechanical structure that is used to act as a mechanical stop, including but not limited to snap rings, springs, stepped end, threads, and tongue and groove connections.

Figure 2:
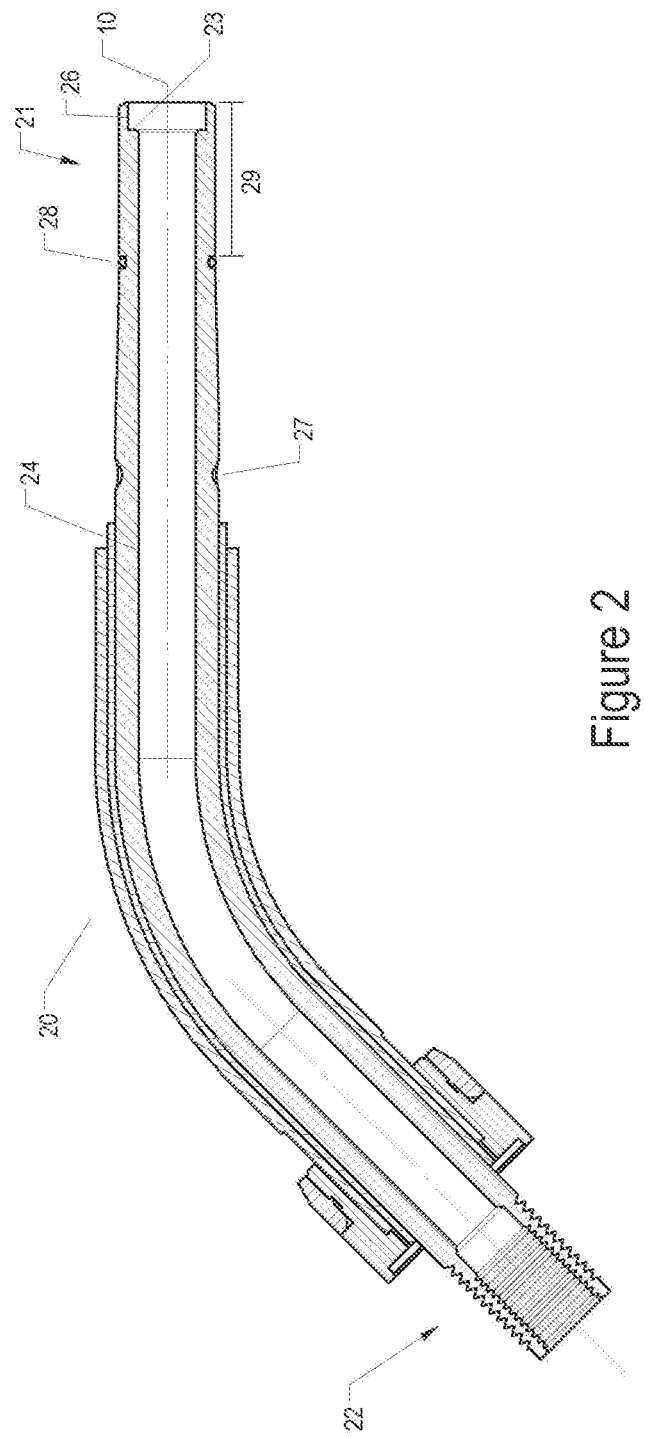
FIG. 2 is a cross-section of a gooseneck in accordance with an embodiment of the present invention.

As seen in FIG. 2, a gooseneck 20 has a feed end 21 and a consumable end 22. There is a locating feature 23 (a machined step in this embodiment) that limits the insertion depth of the quick-change liner 1 into the gooseneck 20. The gooseneck 20 has an internal cavity 24 that is cylindrical in shape and follows the shape of the gooseneck 20 from the feed end 21 to the consumable end 22.

Figure 3:
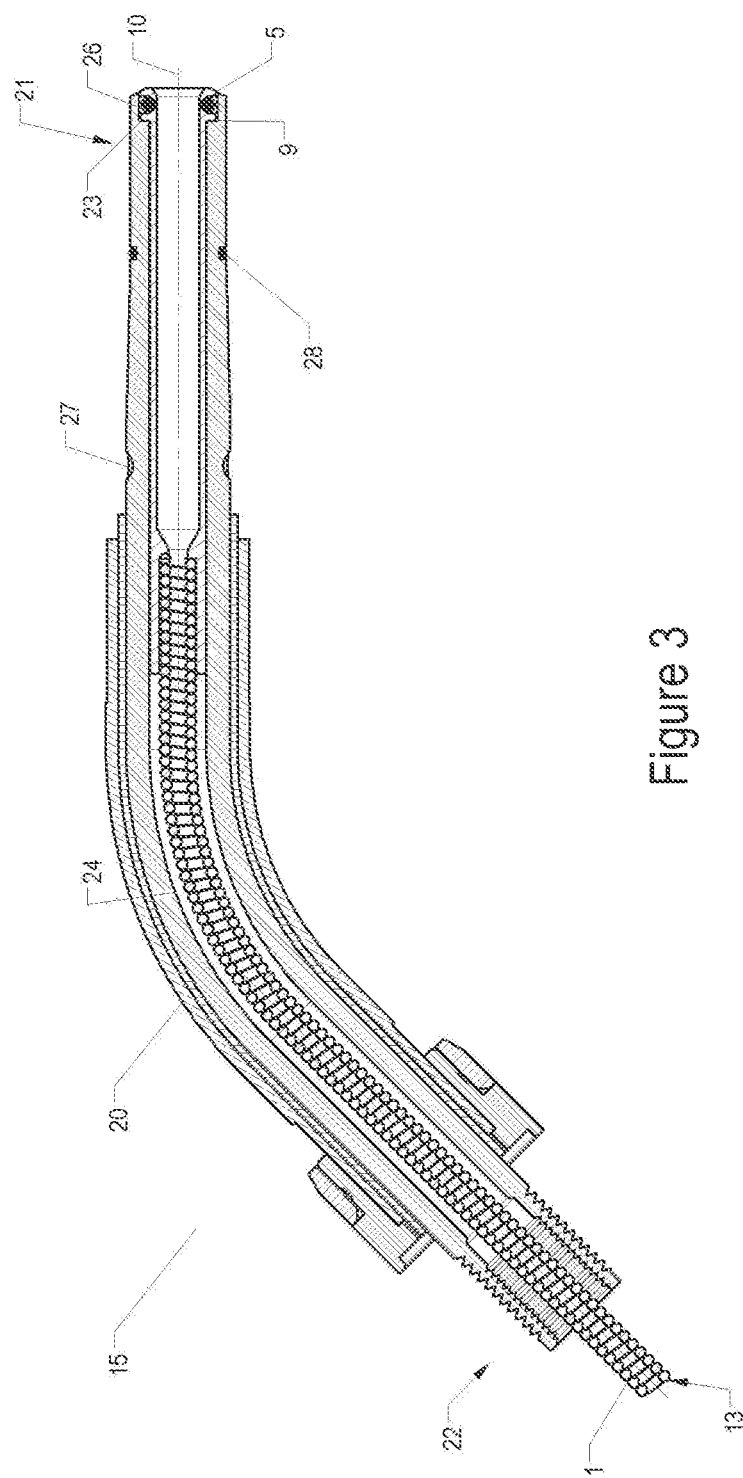
FIG. 3 is a cross-section view of a sub-assembly in accordance with an embodiment of the invention.

As seen in FIG. 3, the quick-change liner 1 is installed inside of the cavity 24 of the gooseneck 20 to create a sub-assembly 15. A predetermined portion of liner 3 located at the distal end 13 of the quick-change liner 1 extends beyond the consumable end 22 of the gooseneck 20, as required by the consumables selected by the end user. The locating feature 23 of the gooseneck 20 and the locating feature 9 of the quick-change liner 1 are in mechanical communication and set the maximum insertion depth of the quick-change liner 1 into the gooseneck 20. The sealing feature 5 is in mechanical communication with cylindrical section 26 of gooseneck 20 there by creating a pneumatic seal. Having the insertion depth of the quick-change liner 1 set by locating features 9 and 23 allows the gooseneck 20 and the installed quick-change liner 1 to rotate about central axis 10 without affecting the length of liner 3 or the location of the distal end 13 of quick-change liner 1. In this embodiment the sealing feature 5, an o-ring, creates a frictional or interference fit that creates a pneumatic seal but also keep the quick-change liner 1 secured within the sub-assembly 15, thereby preventing the quick-change liner 1 from falling out of the sub-assembly 15 during handling or installation by the end user. Other known methods of retaining the quick-change liner 1 within the sub-assembly 15 include but are not limited to threads, snap-rings, and key ways. The sub-assembly 15 can rotate about the central axis 10. Another advantage of using an O-ring 5 as the sealing feature in the quick-change liner is the ability of the quick-change liner 1 to rotate independently of the sub-assembly 15, this prevents the quick-change liner from being imparted with a rotational force about the central axis 10, which could result in a twisting of the liner section 3 relative to the gooseneck 20. The rotatable gooseneck 20 has plurality of locking features 27 that in combination with the complimentary features of the welding torch (not shown) can lock or prevent rotation of the sub-assembly 15 during operation of the welding torch.

In this embodiment, the liner guide 2 of quick-change liner 1 can have an overall length 17 of at least 7.75 cm (3.05 inches). The length 17 of the liner guide 2 is required for use in a rotatable gooseneck 20 that is inserted into a welding torch body 25 that is designed to lock and prevent rotation or removal of the rotatable gooseneck 20 during use. See FIGS. 2, 3 and 5. As seen in FIGS. 2 and 3, the rotatable gooseneck 20 has locking features 27, sealing feature 28, and conduction section 29 located on or adjacent to the feed end 21 of the rotatable gooseneck 20. The conduction section 29 of the gooseneck 20 is inserted into the welding torch body 25 and completes the electrical section between the sub-assembly 15 and welding torch body 25, see FIGS. 4, 5 and 6. The seal 28 of the gooseneck 20 creates a pneumatic seal between the outer diameter of the gooseneck 20 and the inner diameter of the receiving member 34 of the welding torch assembly 37. See also FIGS. 4 and 6. The ratio of the length 17 of the liner guide 2 to the outer diameter 16 of the main liner can have a range of 20.33 to 1 and 13.65 to 1. See FIG. 1. One embodiment has a length 17 to outer diameter 16 ratio between 16.13 to 1 and 13.65 to 1. See also FIG. 1. The ratio of the length 17 of the liner guide 2 to the inner diameter 18 of the main liner can have a range of 61 to 1 and 25.54 to 1. See also FIG. 1. One embodiment has a length 17 to inner diameter 18 ratio between 34.26 to 1 and 28.98 to 1. See also FIG. 1.

Figure 4:
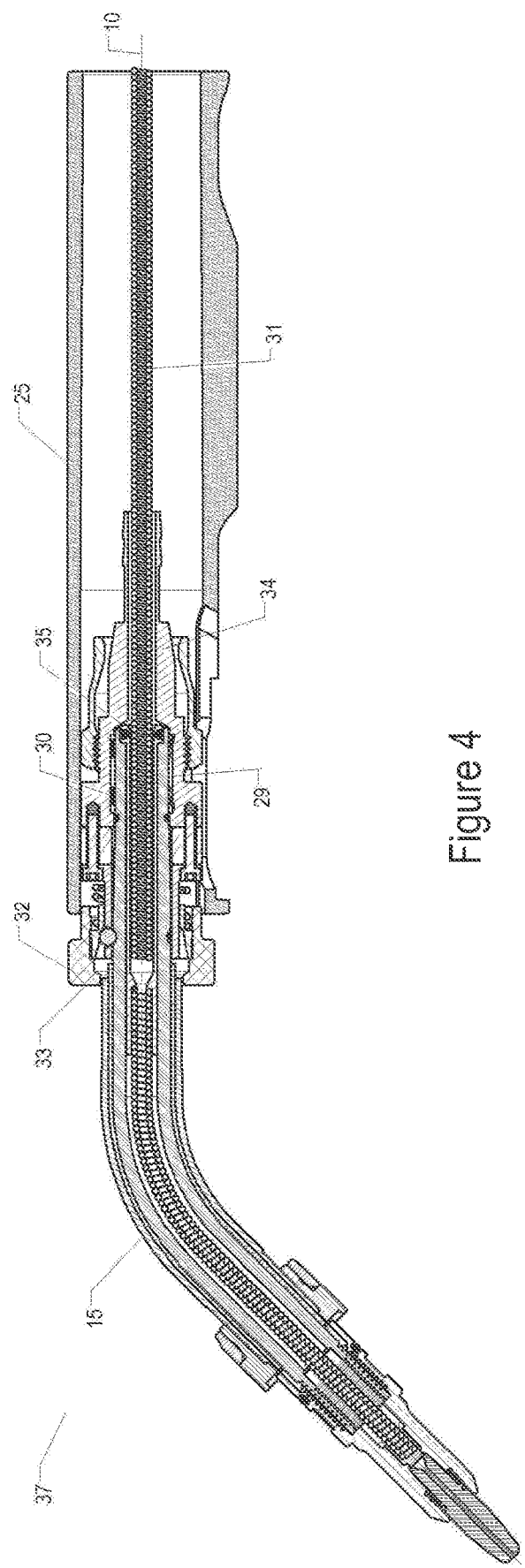
FIG. 4 is a cross-section of a welding torch assembly in accordance with an embodiment of the invention.

When assembled, as seen in FIG. 4, the conduction section 29 is in mechanical communication with the conduction member 30 of the welding torch body 25. When the sub-assembly 15 is assembled into a welding torch assembly 37, the liner guide 2 is inserted at least 5.84 cm (2.3 inches), about the central axis 10, into the welding torch body 25 as measured from the distal face 33 of the release member 32. Prior to being locked in place by the locking features 27, the tapered end 14 of the liner guide 2 can be in contact with the mating face 35 of the receiving member 34 of the welding torch assembly 37. When the rotating gooseneck 20 is locked in place, as seen in FIG. 4, there is a gap between the tapered end 14 of the liner guide 2 and the mating face 35 of the receiving member 34; this gap is necessary to prevent electrical conduction between the receiving member 34 and the liner guide 2.

Figure 5:
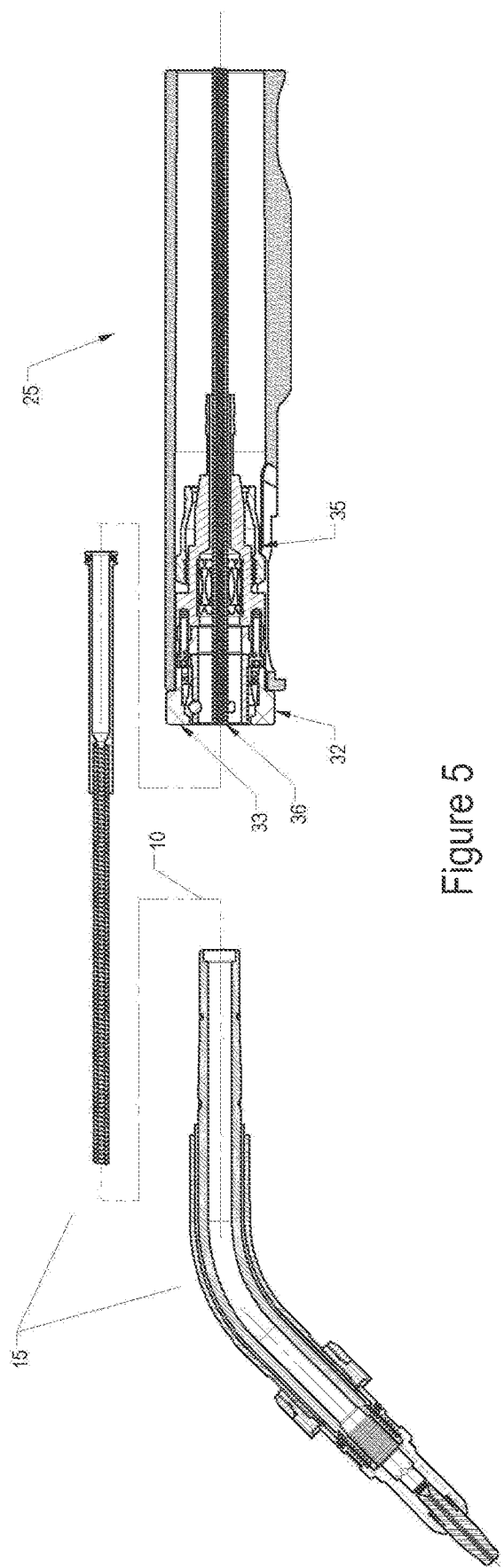
FIG. 5 is an exploded cross-section view of the embodiment of the welding torch assembly seen in FIG. 4.

During assembly, the distal end 36 of the main liner 31 is inserted into the internal cavity 7 of the liner guide 2. See FIGS. 4 and 5. In one embodiment of the invention, the distal end 36 of the main liner 31 is not in contact with the conical section 6 of the liner guide 2 once the sub-assembly 15 has been installed within the welding torch assembly 37 because the distal end 36 has been trimmed to a length that is recessed inside the welding torch assembly 37 about the central axis 10 when measured from the distal face 33 of the release member 32. See FIG. 4. In this embodiment, the main liner 31 is not compressed during insertion of the sub-assembly 15 into the welding torch assembly 37. This configuration can be achieved by depressing the release member 32 into the unlocked position and trimming the main liner 31 to abut the distal face 33 of the release member 32 while the release member 32 remains depressed, as seen in FIG. 5. In this embodiment, no measurement is needed to trim the main liner 31 to the desired length needed for operation. This is advantageous because the end user will not need to carry or use measurement tools during the installation of the main liner into the welding torch body 25, as required by some prior art welding torch assemblies.

During operation, main liners 31 have been known to increase or decrease in length as the coils that make up the main liner 31 relax or tighten from repeated movement associated with operation of the welding torch assembly 37. A decrease in length is a typical occurrence; a reduction in length of at least 0.635 cm (0.25 inch) is not uncommon in prior art welding torch assemblies. The quick-change liner 1 does not need to be adjusted to accommodate a reduction in the length of main liner 31 because the conical section 6 will guide a welding wire into the liner 3 of the quick-change liner 1, regardless of the length of the main liner 31. See FIGS. 4 and 6. A reduction in length of up to 5.08 cm (2 inches) is possible with this embodiment of the invention, provided the rotating gooseneck 20 is not removed from the welding torch assembly 37. Accommodating a reduction in length of the main liner 31 is possible by locating the conical section 6 of the liner guide 2 at approximately the same axial position, about the central axis 10, as the release member 32 when the sub-assembly 15 is assembled in a welding torch assembly 37. See FIGS. 4 and 6. Ideally, the constricted side of the conical section 6 will abut the axial location of the distal face 33 of the release member 32 about the central axis 10. See also FIGS. 4 and 6. At a significantly reduced length of the main liner 31, the insertion of the rotatable gooseneck 20 may not be possible or practicable as the length of the main liner 31 will not be determinable by visual inspection of an unassembled welding torch assembly 37.

Figure 6:
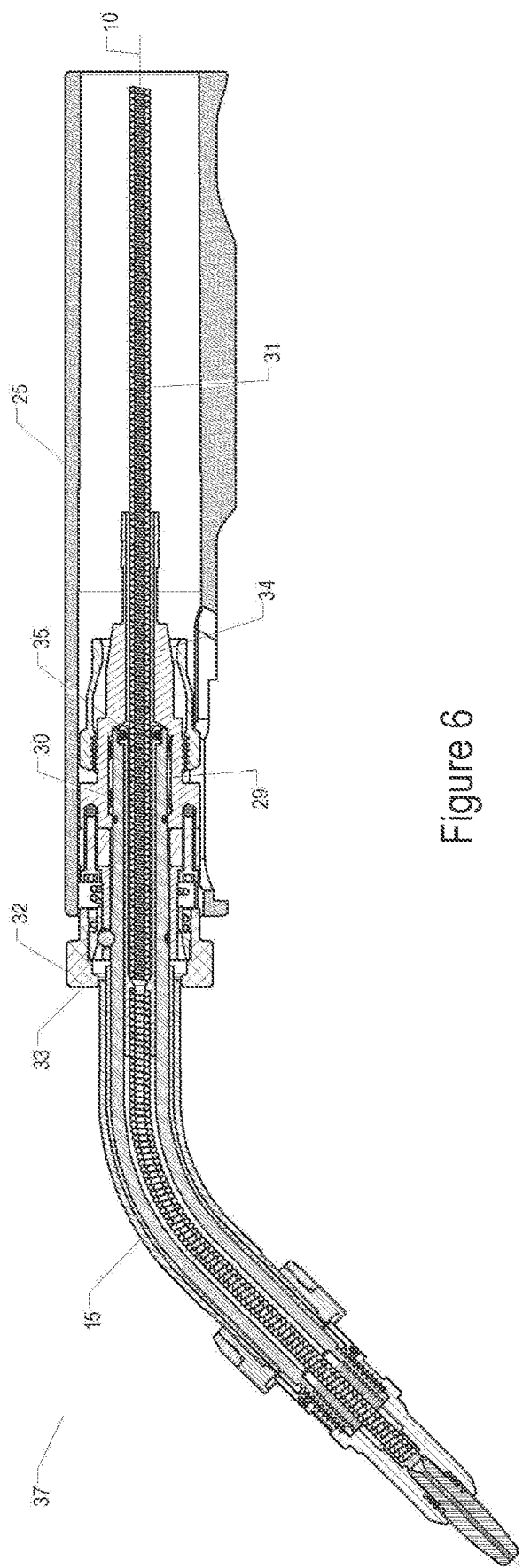
FIG. 6 is a cross-section of welding torch assembly in accordance with another embodiment of the invention.

In another embodiment of the present invention, the main liner 31 is in contact with the conical section 6 of the liner guide 2 during assembly of the sub-assembly 15 into the welding torch body 25 of the welding torch assembly 37. See FIG. 6. This contact can be achieved by trimming the distal end 36 of the main liner 31 to abut the distal face 33 of the release member 32 when the release member is in the locked position, see FIG. 6. This will put the main liner 31 in compression when the sub-assembly 15 is inserted and locked in the welding torch assembly 37, thereby requiring a force in the axial direction to compress the main liner 31, as seen in FIG. 6, during assembly of the welding torch assembly 37. The compression of the main liner 31 is made possible locating the conical section 6 of the liner guide 2 at approximately the same axial position, about the central axis 10, as the release member 32 when the sub-assembly 15 is assembled in a welding torch assembly 37. See FIGS. 4 and 6. Ideally, the constricted side of the conical section 6 will abut the axial location of the distal face 33 of the release member 32 about the central axis 10. See also FIGS. 4 and 6.

In yet another embodiment, additional compression is possible by trimming the length of the main liner 31 to some length that extends beyond distal face 33 of the release member 32 when in the lock position, as seen in FIG. 6. Embodiments that place the main liner 31 into compression will have the ability to allow the main liner 31 to contract during normal operation and remain in contact with the conical section 6 of the liner guide 2 up to the point that the main liner is no longer in compression. The compression of the main liner 31 is made possible locating the conical section 6 of the liner guide 2 at approximately the same axial position, about the central axis 10, as the release member 32 when the sub-assembly 15 is assembled in a welding torch assembly 37. See FIGS. 4 and 6. Ideally, the constricted side of the conical section 6 will abut the axial location of the distal face 33 of the release member 32 about the central axis 10. See also FIGS. 4 and 6. This configuration is advantageous to end users that desire keeping the main liner 31 in contact with the conical section 6 of the liner guide 2 at all times during operation or for as long a period of time that is possible by the compressibility of the main liner 31.

While certain features of the invention have been illustrated and described herein, many modifications and changes will be apparent to those skilled in the art. It is, therefore, to be understood that the scope of the invention is only to be limited by the appended claims and are intended to cover all such modifications and changes as fall within the true spirit of the invention.

What is claimed is:

1. A replaceable liner for use in a welding torch assembly comprising:
    a liner guide;
    a section of liner inserted within a section of the liner guide,
    wherein prior to being locked in place by a locking feature of a rotating gooseneck, a tapered end of the liner guide is in contact with a receiving member of the welding torch assembly, and
    when the rotating gooseneck is locked in place, a gap is formed between the tapered end and the receiving member to prevent an electrical conduction between the receiving member and the liner guide; and
    at least one sealing feature positioned adjacent the tapered end and the at least one sealing feature is configured to permit rotation of the replaceable liner independent of the welding torch assembly and prevent the replaceable liner from being twisted relative to the welding torch assembly.

2. The replaceable liner for use in the welding torch assembly of claim 1, further comprising a transition section.

3. The replaceable liner for use in the welding torch assembly of claim 2 wherein the transition section is conical in shape.

4. The replaceable liner for use in the welding torch assembly of claim 2 wherein the transition section is at least 3.8 mm in length as measured along a central axis of the replaceable liner.

5. The replaceable liner for use in the welding torch assembly of claim 2 wherein the transition section has an angle between 30° and 60°.

6. The replaceable liner for use in the welding torch assembly of claim 1, further comprising a joint section.

7. The replaceable liner for use in the welding torch assembly of claim 6 wherein the joint section is a mechanical connection.

8. The replaceable liner for use in the welding torch assembly of claim 6 wherein the joint section is at least 7.5 mm in length as measured along a central axis of the replaceable liner.

9. The replaceable liner for use in the welding torch assembly of claim 1 wherein the liner guide is at least one-third of a total length of the replaceable liner as measured along a central axis of the replaceable liner.

10. The replaceable liner for use in the welding torch assembly of claim 1 wherein the liner guide is at least 50 mm in length as measured along a central axis of the replaceable liner.

11. The replaceable liner of claim 1, wherein a ratio of a length of the liner guide to an outer diameter of the section of liner is in a range between 20.33 to 1 and 13.65 to 1.

12. The replaceable liner of claim 1, wherein a ratio of a length of the liner guide to an inner diameter of the section of liner is in a range between 61 to 1 and 25.54 to 1.

* * * * *